US006218448B1

(12) United States Patent
Kraaijevanger et al.

(10) Patent No.: US 6,218,448 B1
(45) Date of Patent: Apr. 17, 2001

(54) MIXTURES OR PASTES BASED ON CELLULOSE AND THE USE THEREOF IN COATINGS

(75) Inventors: Paulus T. F. M. Kraaijevanger, Oegstgeest; Klaas J. H. Kruithof, Veenendaal, both of (NL); Jörgen E. Raasing, Holte (DK); Reinhold Heicht, Wilhelmsthal; Lutz Hoppe, Walsrode, both of (DE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/277,114

(22) Filed: Mar. 26, 1999

(30) Foreign Application Priority Data

Apr. 1, 1998 (NL) .................................................... 1008777
Apr. 22, 1998 (EP) .................................................. 98201296

(51) Int. Cl.[7] ................................ C08L 1/20; C08L 1/10; C08L 1/12; C08L 1/14; C08L 1/18
(52) U.S. Cl. .................................. 524/31; 524/32; 524/33; 524/37; 524/38; 524/39; 524/40; 524/41
(58) Field of Search ................................ 524/31, 32, 33, 524/37, 38, 39, 40, 41

(56) References Cited

U.S. PATENT DOCUMENTS

| 3,450,652 | 6/1969 | Lin | 524/33 |
| 4,517,324 | 5/1985 | Luhmann et al. | 524/27 |
| 4,731,121 | 3/1988 | Luhmann et al. | 524/27 |
| 5,369,185 | 11/1994 | Burgoyne et al. | 525/327.6 |

FOREIGN PATENT DOCUMENTS

| 3338274 | 4/1985 | (DE) . | |
| 255 608 | 2/1988 | (EP) | C09D/175/02 |
| 744 449 | 11/1996 | (EP) | C09D/101/10 |
| 97/19120 | 5/1997 | (WO) | C08G/18/08 |

OTHER PUBLICATIONS

*Derwent Abstract* 85–099973.
*Derwent Abstract* 97–001233/01.
*European Search Report* dated Sep. 30, 1998.

*Primary Examiner*—Peter Szekely
(74) *Attorney, Agent, or Firm*—David H. Vickrey

(57) ABSTRACT

The invention pertains to mixtures or pastes comprising a cellulose ester, a binder resin, water, and optionally a plasticiser, an organic solvent, an emulsifier, and/or a thickener, wherein in that at least a portion of the binder resin is functionalized with an amino-functional acetal. The mixtures can be cured at ambient temperature.

The mixtures or pastes can be used for, for example, varnishing wood, metal, synthetic material, paper, leather, glass, and plastic films, and in particular on surfaces where great value is placed on solventless coating compositions.

17 Claims, No Drawings

MIXTURES OR PASTES BASED ON CELLULOSE AND THE USE THEREOF IN COATINGS

The invention pertains to viscous mixtures or pastes of a cellulose ester, a binder resin, and water, and optionally a plasticiser, an organic solvent, an emulsifier, and/or a thickener, and to coating compositions incorporating such mixtures or pastes.

BACKGROUND OF THE INVENTION

Mixtures or pastes based on cellulose esters have earlier been proposed in EP-B-076 443 and EP-B-184 127.

The products described in these documents are used to a large extent for varnishing wood, metal, synthetic material, paper, leather, glass, and plastic films, all surfaces where great value is placed on solventless coating compositions.

A drawback to the coats obtained using the known coating compositions is their poor hardness and comparatively low resistance to various liquids such as alcohol, red wine, coffee, and the like.

The invention now provides a coating composition with markedly enhanced properties such as greater hardness and improved resistance to chemicals. The invention consists in that in the mixtures or pastes of the known type mentioned in the opening paragraph wherein at least a portion of the binder resin is functionalized with an amino-functional acetal. "Amino-functional" means an amino group is present.

It should be noted that it is known in itself from EP-B-255 608 that a thermosetting coating composition can be obtained by mixing hydroxyl group-containing compounds with a non-volatile acetal-functional cross-linking agent which can be obtained by converting a compound having a free isocyanate group with a hydroxyl-functional acetal. A possible drawback to the coating compositions described in this document is that when they are applied as coats, they have to be cured at a comparatively high temperature. A further drawback is the limited availability in industrial quantities of the hydroxyacetal used in these coating compositions.

EP-A-744 449 also describes mixtures or pastes based on cellulose esters and a binder resin in coating compositions. The use of a polysiloxane compound is required to achieve enhanced stability in water, while the use of an aqueous polyisocyanate dispersion as cross-linking is necessary to obtain a coating with markedly enhanced properties.

For that reason it must be considered extremely surprising that the now proposed coating compositions can be cured in a comparatively short time even at ambient temperature. This is of major significance for industrial coating processes of heat sensitive substrates like, e.g., wood which is used in the furniture industry. The use of coatings curable only at high temperatures would not only require unacceptably high investments in that branch of industry, but also result in higher costs (e.g. energy).

SUMMARY OF THE INVENTION

The invention is, in one embodiment, a mixture comprising cellulose ester, binder resin, and water, wherein at least a portion of the binder resin is functionalized with an amino-functional acetal.

In other embodiments, the mixture further comprises a plasticizer, an organic solvent, an emulsifier and/or a thickener.

In another embodiment, the mixture is in the form of a paste.

The mixture or paste is preferably used in coating compositions.

DETAILED DESCRIPTION OF THE INVENTION

Among the cellulose esters eligible for use according to the invention are the known nitrate esters, as well as esters based on acetobutyrate and acetopropionate.

According to the invention, it was found that very favorable results can be obtained when at least a portion of the resin is functionalized by converting the amino group of the amino-functional acetal with a free isocyariate, (meth) acrylate, ester or epoxy group present in the binder resin, or with an at least difunctional compound having at least one free isocyariate, (meth)acrylate, ester or epoxy group and a group which is reactive towards one or more of the groups present in the resin to be functionalized. Usually, this means hydroxyl groups, which exhibit a high reactivity towards, e.g., isocyanate or epoxy groups.

Examples of at least difunctional isocyanate compounds include aliphatic, cycloaliphatic or aromatic di-, tri- or tetraisocyanates which may be ethylenically unsaturated or not, such as: 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyariate, 2,4,4-trimethyl hexamethylene diisocyanate, dodecamethylene diisocyariate, ω,ω'-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-diisocyanate, 3,3'-dimethyl dicyclohexyl methane-4,4'-diisocyanate, a toluene diisocyanate, 1,3-bis(isocyanatomethyl)benzene, a xylene diisocyanate, 1,5-dimethyl-2,4-bis(isocyanatomethyl) benzene, 1,5-dimethyl-2,4-bis(2-isocyanatoethyl)-benzene, 1,3,5-triethyl-2,4-bis(isocyanatomethyl)-benzene, 4,4'-diisocyanatodiphenyl, 3,3'-dichloro4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenyl methane, 3,3'-dimethyl-4,4'-diisocyanatodiphenyl methane, a diisocyanatonaphthalene, the adduct of 2 molecules of a diisocyanate, e.g. hexamethylene diisocyanate or isophorone diisocyanate, to a diol such as ethylene glycol, the adduct of 3 molecules of hexamethylene diisocyanate to 1 molecule of water (available under the trade designation Desmodur®N of Bayer®), the adduct of 1 molecule of trimethylol propane to 3 molecules of toluene diisocyanate (available under the trade designation Desmodur®L of Bayer®), the adduct of 1 molecule of trimethylol propane to 3 molecules of isophorone diisocyanate, compounds such as 1,3,5-triisocyanatobenzene and 2,4,6-triisocyanatotoluene, and the adduct of 1 molecule of pentaerythritol to 4 molecules of toluene diisocyanate. Preferably, an aliphatic or cycloaliphatic di- or triisocyariate having about 8 to about 36 carbon atoms is employed.

Typical examples of compounds containing at least 2 acryloyl or methacryloyl groups include the (meth)acrylic esters of di-, tri- or polyvalent polyols, including polyester polyols and polyether polyols; adducts of, on the one hand, a hydroxyl group-containing (meth)acrylic ester of a polyol to, on the other hand, an at least difunctional isocyanate compound; and adducts of (meth)acrylic acid to an at least difunctional epoxy compound.

Ester compounds suitable for use are esters of polycarboxylic acids and low-boiling alcohols. Examples of these are methyl, ethyl, n-propyl, isopropyl, n-butyl, sec-butyl, and tert-butyl esters of di-, tri- or tetracarboxylic acids such as malonic acid, adipinic acid, dimeric fatty acids, maleic acid, fumaric acid, cyclohexane-1,2-dicarboxylic acid, phthalic acid, isophthalic acid, cyclohexane-1,3-dicarboxylic acid, cyclohexane-1,4-dicarboxylic acid, thiophene-1,5-dicarboxylic acid, trimellitic acid, ethylene tetracarboxylic acid, acetylene dicarboxylic acid, and propane-1,1,2,3-tetracarboxylic acid.

Examples of suitable at least difunctional, solid or liquid epoxy compounds include the di- or polyglycidyl ethers of (cyclo)aliphatic or aromatic hydroxy compounds such as ethylene glycol, glycerol, cyclohexane diol, mononuclear di- or polyvalent phenols, bisphenols such as Bisphenol-A and Bisphenol-F, and polynuclear phenols; glycidyl ethers of fatty acids having about 6 to about 24 carbon atoms; glycidyl(meth)acrylate; isocyanurate group-containing epoxy compounds, an epoxydised polybutadiene; hydaritoin epoxy resins; epoxy resins obtained by epoxydising aliphatic and/or cycloaliphatic alkenes, such as dipentene dioxide, dicyclopentadiene dioxide, and vinylcyclohexene dioxide, and glycidyl groups-containing resins such as polyesters or polyurethanes containing one or more glycidyl groups per molecule, or mixtures of the aforesaid epoxy resins.

So far, optimum results have been obtained using 1-amino-4,4-dialkoxybutane having 1 to 4 carbon atoms per alkoxy group as the amino-functional acetal.

Eligible binder resins are all resins which are compatible with the cellulose esters employed. Examples of eligible resins according to the invention are polyesters, epoxy resins, polyethers, polyurethanes, amino resins such as melamine formaldehyde and urea formaldehyde resins, resins having blocked isocyanate groups, and acrylic or vinyl polymers.

According to the invention, preference is given to mixtures or pastes where the functionalized portion of the binder resin is an alkyd resin. Also, the other aforementioned resins are eligible to be functionalized in principle. According to the invention, the binder resin is regarded as functionalized not only when the amino-functional acetal is covalently bonded to this resin, but also when the resin is mixed with a compound obtained by converting the aminoacetal compound with a difunctional compound such as a diisocyanate, a diacrylate ester, a diester or a diepoxide, and the resulting diacetal is incorporated into one of the aforesaid resins. Included in "difunctional compounds" are both compounds wherein the functional groups are the same and those where the functional groups are different.

Preferred are mixtures or pastes where the binder mix is made up of an at least partially functionalized alkyd resin. The alkyd resin can be made up of a single resin or form part of a mixture of several alkyd resins, including functionalized resins.

Optionally, a portion of the alkyd resins dries oxidatively by incorporating unsaturated aliphatic compounds, at least a portion of which is polyunsaturated. The unsaturated aliphatic compounds preferably are unsaturated aliphatic monocarboxylic acids, more particularly polyunsaturated aliphatic monocarboxylic acids. Examples of mono-unsaturated fatty acids are myristoleic acid, palmitoleic acid, oleic acid, gadoleic acid, erucic acid, and ricinoleic acid. Preferably, use is made of fatty acids containing conjugated double bonds, such as dehydrated ricinus oil fatty acid and/or wood oil fatty acid. Other monocarboxylic acids suitable for use include tetrahydrobenzoic acid and hydrogenated or non-hydrogenated abietic acid or isomer thereof. If so desired, the above-envisaged monocarboxylic acids may be employed wholly or in part as triglyceride, e.g. as vegetable oil, in the preparation of the alkyd resin. Optionally, mixtures of two or more of such monocarboxylic acids or triglycerides may be used, if so desired in combination with one or more saturated, (cyclo)aliphatic, or aromatic monocarboxylic acids, e.g., pivalic acid, 2-ethyl hexanoic acid, lauric acid, palmitic acid, stearic acid, 4-tert.butyl benzoic acid, cyclopentane carboxylic acid, naphthenic acid, cyclohexane carboxylic acid, 2,4-dimethyl benzoic acid, 2-methyl benzoic acid, and benzoic acid.

Optionally, there may be incorporated into the alkyd resin also acids suitable for forming dendrimers such as dimethylol propionic acid, or polycarboxylic acids such as phthalic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerised fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene cyclohexane-1,2-dicarboxylic acid, butane-1,2,3,4-tetracarboxylic acid, endoisopropylidene cyclohexane-1,2-dicarboxylic acid, cyclohexane-1,2,4,5-tetracarboxylic acid, and butane-1,2,3,4-tetracarboxylic acid. If so desired, the above-envisaged carboxylic acids may be used as anhydride or in the form of an ester, e.g., an ester of an alcohol having 1–4 carbon atoms.

In addition, the alkyd resin may be composed of di- or polyvalent hydroxyl compounds. Examples of suitable divalent hydroxyl compounds are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the above-envisaged compounds, such as di- and trimethylol propane and di-, tri-, and tetrapentaerythritol. Preferably, use is made of compounds having 3–12 carbon atoms, e.g., glycerol, pentaerythritol and/or dipentaerythritol.

The alkyd resins can be obtained via direct esterification of the constituent components, possibly with a portion of these components already having been converted into ester diols or polyester diols. Alternatively, the unsaturated fatty acids can be added in the form of a drying oil, such as linseed oil, tunafish oil, dehydrated castor oil, coconut oil, and dehydrated coconut oil. The final alkyd resin is then formed by means of transesterification with the other added acids and diols. This transesterification generally is performed at a temperature in the range of about 115 to about 250° C., possibly with solvents such as toluene and/or xylene also being present. The reaction generally takes place in the presence of a catalytic amount of a transesterification catalyst. Examples of transesterification catalysts suitable for use include acids such as p-toluene sulphonic acid, a basic compound such as an amine, or compounds such as calcium oxide, zinc oxide, tetraisopropyl orthotitanate, dibutyl tin oxide, and triphenyl benzyl phosphonium chloride.

The functionalized resin should be capable of binding at least such a number of acetal groups as corresponds to the desired weight percentage of acetal groups in the binder resin. This weight percentage, calculated as dimethoxyacetal, e.g. as 1-amino4-4'dimethoxybutane, preferably is in the range of about 1 to about 20 wt. %, more preferably of about 1 to about 15 wt. %.

The eligible cellulose esters according to the invention are cellulose nitrate, cellulose acetobutyrate, cellulose acetopropionate, and cellulose acetate, as well as mixtures thereof.

In addition to the aforementioned synthetic resins the binder resin may comprise natural resins, such as colophonium resin, balsam resin, shellac, copal resin and/or dammar resin.

Optionally, a plasticiser may be incorporated into the mixtures or pastes. Suitable plasticisers include the esters of phthalic acid such as dibutyl phthalate, diisobutyl phthalate, di-2-ethylhexyl phthalate, diisononyl phthalate, dibutyl glycol phthalate, esters of adipic acid, sebacic acid, and fatty acids, epoxydised fatty acids, esters of phosphoric acid, and vegetable oils which may be modified or not.

Optionally, the preparation of the mixtures or pastes according to the invention may be carried out in the presence of one or more solvents. These can be removed wholly or in part after the preparation. Suitable solvents; are esters of acetic acid, such as n-butyl acetate, isobutyl acetate, methoxypropyl acetate, ethoxypropyl acetate, butyl glycol acetate, 3-methoxy-n-butyl acetate, ethyl lactate, ethyl-(3-ethoxy)propionate; ketones, such as methylisobutyl ketone, diisobutyl ketone, cyclohexanone; alcohols, such as n-butanol, isobutanol, 3-methoxybutanol; aromatic hydrocarbons, such as toluene, xylene, and mixtures of these solvents.

Examples of suitable emulsifiers are dodecyl benzene sulphonate, butyl naphthalene sulphonate, lauryl stearyl sulphate, dioctyl disodium succinate, and the oxethylates of octyl phenol or nonyl phenol having a degree of oxethylation of about 4 to about 60.

Furthermore, advantageous properties can be achieved using a polymeric dispersant (see e.g. WO 97/19120) or a polysiloxane, above all a polyethermodified polysiloxane.

If so desired, a thickener may also be present. One example of a suitable thickener is a polyurethane resin.

Mixtures or pastes according to the invention preferably contain the aforementioned constituents in the following concentrations:
about 2.0—about 60 wt. % of cellulose ester,
about 2.0—about 60 wt. % of binder resin, at least a portion of which is functionalized,
about 1.0—about 80 wt. % of water,
0.0—about 40 wt. % of plasticiser,
0.0—about 20 wt. % of emulsifier,
0.0—about 20 wt. % of thickener, and
0.0—about 45 wt. % of organic solvent, with the sum total of the weight percentages always being 100.

The invention further pertains to coating compositions based on cellulose esters in which the binder resin is functionalised with an amino-functional acetal. When these are incorporated into the coating composition, a small amount of an acid catalyst can be added prior to the application of the lacquer. Examples of suitable acids are p-toluene sulphonic acid, dodecyl benzene sulphonic acid, dinonyl naphthalene disulphonic acid, and other acid catalysts. The amount of acid catalyst to be incorporated corresponds to 0,05 to 1 wt. %, calculated on the solids content of the mixtures or pastes.

The invention will be elucidated with reference to the following examples. These are intended to illustrate the invention but are not to be construed as limiting in any manner the scope thereof. Unless otherwise indicated, "parts" stands for "parts by weight" and "%" for "weight per cent" hereinafter. The solids content SC was calculated or determined in accordance with ISO 3251-1993 after 1 hour of heating at 120° C. and is given in wt. %. The viscosity was determined at 23° C. using a viscometer as specified by Brookfield (spindle 4 and motor set at 30) and is given in cPa.s. The acid value and hydroxyl number value are given in mg KOH per gram of resin. The molecular weights were determined with the aid of GPC (THF as mobile phase and polystyrene as standard). Unless otherwise indicated, "hardness" stands for "Pendulum hardness according to Persoz".

EXAMPLE I

Preparation of hydroxyl-functional alkyd resin 32.6 parts of tall oil fatty acid, 17.7 parts of trimethylol propane, 16.6 parts of pentaerythritol, and 33.1 parts of phthalic anhydride were mixed and heated for 50 minutes at 185° C. with continuous stirring. At 240° C. xylene was added, and the water of reaction was removed with refluxing until an acid value of <7 was reached. After cooling, an alkyd having the following properties was obtained, the listed values being related to a solids content of 100%. Next, the product was diluted with butyl acetate to a solids content of 70±1.5%.

| Oil length | 33% |
|---|---|
| Hydroxyl number (of theory) mg KOH/g | 145 |
| Number average molecular weight Mn | 2470 |
| Weight average molecular weight Mw | 13860 |

EXAMPLE II

Three solutions (E1, E2, and E3) were prepared of the alkyd resin of Example I functionalized with 1-amino-4,4-dimethoxybutane (ABAA). The quantities by weight (in g) used in the preparation, the reaction times, and the temperatures are listed in the table below.

|  | E1 | E2 | E3 |
|---|---|---|---|
| alkyd resin of Ex. I | 367 | 367 | 550 |
| butyl acetate | 257 | 257 | 200 |
| dibutyl tin laureate | 1.8 | 1.8 | 2.0 |
| isophorone diisocyanate (IPDI) | 71.7 | 71.7 | 59.8 |
| 10 min. residence at room temp. | " | " | " |
| number of minutes heated to 60° C. | 40 | " | 30 |
| temperature of 60° C. for | 2 hours | " | 90 minutes at 55° C. |
| cooling to room temperature | " | " | " |
| feeding of ABAA for 15 min. at temp. <30° C. | 38.6 | 38.6 | 36.1 |
| 1 hour of stirring | " | " | " |
| 3 hours of stirring at | 80° C. | 60° C. | 60° C. |
| wt. % of ABAA calculated on solids content | 10.5 | 10.7 | 7.5 |

EXAMPLE III

Three oil-in-water emulsions were prepared by combining the following components (in parts by weight)

|  | III-1 | III-2 | III-3 |
|---|---|---|---|
| functionalised alkyd resin solution E2 from Example II | 34.5 | 44.0 | 48.5 |
| dibutyl phthalate | 3.0 | 3.0 | 3.0 |
| methoxypropyl acetate | 2.5 | 2.5 | 2.5 |
| emulsifiers | 4.5 | 4.5 | 4.5 |
| nitro-cellulose (Standard 24 E (65 wt. % dry solids) | 27.0 | 17.5 | 13.0 |

Each mixture was homogenised at 45° C. and with slow stirring 28.5 parts of water were added dropwise. The obtained oil-in-water emulsions had a alkyd resin to nitro-cellulose ratio based on solids of 1:1, 2:1, and 3:1, respectively. To prepare lacquers out of these emulsions, 100 parts of each emulsion was mixed at room temperature with 5 parts of a non-ionic wax dispersion, 8 parts of a silica-premix, 2 parts of butylglycol acetate, and 15 parts of water.

The lacquers were applied to a wooden substrate and the hardness of the lacquer was measured one night and 2 days after application. The following results were found:

| Example | hardness of the lacquer after one night | hardness of the lacquer after two days |
|---|---|---|
| III-1 | 150 | 185 |
| III-2 | 90 | 100 |
| III-3 | 60 | 60 |

Example IV (Comparative example)

An oil-in-water emulsion was prepared by combining the following components (in parts by weight)

|  | IV-1 |
|---|---|
| alkyd resin solution from Example I | 33.0 |
| dibutyl phthalate | 3.0 |
| methoxypropyl acetate | 3.0 |
| emulsifiers | 4.5 |
| nitro-cellulose (Standard 24 E (65 wt. % dry solids) | 18.5 |
| butylglycol acetate | 10.0 |

This mixture was homogenised at 45° C. and with slow stirring 38.0 parts of water were added dropwise. The obtained oil-in-water emulsion had a alkyd resin to nitro-cellulose ratio based on solids of 2:1. To prepare lacquers out of these emulsions, 100 parts of each emulsion was mixed at room temperature with 5 parts of a non-ionic wax dispersion, 10 parts of a silica-premix, and 7 parts of water.

The lacquers were applied to a wooden substrate and the hardness of the lacquer was measured one night and 2 days after application. The following results were found:

| Example | hardness of the lacquer after one night | hardness of the lacquer after two days |
|---|---|---|
| IV-1 | 55 | 55 |

We claim:

1. A mixture comprising cellulose ester, binder resin, and water, wherein at least a portion of the binder resin is functionalized with an amino-functional acetal.

2. A mixture according to claim 1, wherein at least a portion of the resin is functionalized by converting the amino group of the amino-functional acetal with a free isocyanate, (meth)acrylate, ester or epoxy group present in the binder resin.

3. A mixture according to claim 1, wherein at least a portion of the resin is functionalized by converting the amino group of the amino-functional acetal with an at least difunctional compound having at least one free isocyanate, (meth)acrylate, ester or epoxy group and a group which is reactive towards one or more of the groups present in the resin to be functionalized.

4. A mixture according to claim 1, wherein the amino-functional acetal is 1-amino-4,4-dialkoxybutane having about 1 to about 4 carbon atoms per alkoxy group.

5. A mixture according to claim 1, wherein the binder resin is a resin selected from the group consisting of polyesters, epoxy resins, polyethers, polyurethanes, amino resins, resins with blocked isocyanate groups, acrylic vinyl polymers, vinyl polymers, and mixtures thereof.

6. A mixture according to claim 1, wherein the functionalized portion of the binder resin is an alkyd resin.

7. A mixture according to claim 1, wherein the binder is an alkyd resin which is at least partially functionalized.

8. A mixture according to claim 1, wherein the weight percentage of acetal groups in the binder resin, calculated as 1-amino-4-4'dimethoxybutane, is in the range of about 1 to about 20 wt. %.

9. A mixture according to claim 1, comprising about 2.0—about 60 wt. % of cellulose ester, about 2.0—about 60 wt. % of binder resin, of which at least a portion is functionalized, about 1.0—about 80 wt. % of water, about 0.0—about 40 wt. % of plasticiser, about 0.0—about 20 wt. % of emulsifier, about 0.0—about 20 wt. % of thickener, and about 0.0—about 45 wt. % of organic solvent, wherein the sum total of the weight percentages is 100.

10. Mixtures according to claim 1, wherein the cellulose ester is nitrocellulose.

11. A paste comprising a mixture acording to claim 1.

12. A mixture according to claim 1, further comprising a plasticiser.

13. A mixture according to claim 1, further comprising an organic solvent.

14. A mixture according to claim 1, further comprising an emulsifier.

15. A mixture according to claim 1, further comprising a thickener.

16. A method of preparing a mixture, said method comprising combining cellulose ester, water and binder resin, wherein at least a portion of the binder resin is functionalized with an amino-functional acetal.

17. A coating composition comprising a mixture according to claim 1.

* * * * *